Nov. 15, 1932.  W. H. D. BROUSE  1,887,918
AIR ELIMINATOR FOR LIQUID PUMP EQUIPMENT
Filed May 8, 1931  2 Sheets-Sheet 1

Inventor.
William H. D. Brous

Nov. 15, 1932.  W. H. D. BROUSE  1,887,918

AIR ELIMINATOR FOR LIQUID PUMP EQUIPMENT

Filed May 8, 1931  2 Sheets-Sheet 2

Inventor.
William H. D. Brouse.
by
H. J. S. Dennison
atty.

Patented Nov. 15, 1932

1,887,918

UNITED STATES PATENT OFFICE

WILLIAM H. D. BROUSE, OF TORONTO, ONTARIO, CANADA, ASSIGNOR TO SERVICE STATION EQUIPMENT CO. LIMITED, OF TORONTO, CANADA

AIR ELIMINATOR FOR LIQUID PUMP EQUIPMENT

Application filed May 8, 1931. Serial No. 535,918.

The principal objects of this invention are, to overcome the difficulties met with in the dispensing of liquids, such as gasoline, through the accumulation of air in the pump and measuring equipment, and to provide an air eliminator which will automatically release the air accumulating in the system.

The principal features of the invention consist in the novel construction and arrangement of parts, whereby the liquid in its passage to the meter travels through a chamber having an air release valve which is automatically closed upon the rising of the level of the liquid therein to a predetermined point, and whereby any overflow of liquid is returned to the supply tank.

In the accompanying drawings, Figure 1 is a longitudinal sectional view through the eliminating device taken on the line 1—1 of Figure 2.

Figure 1:
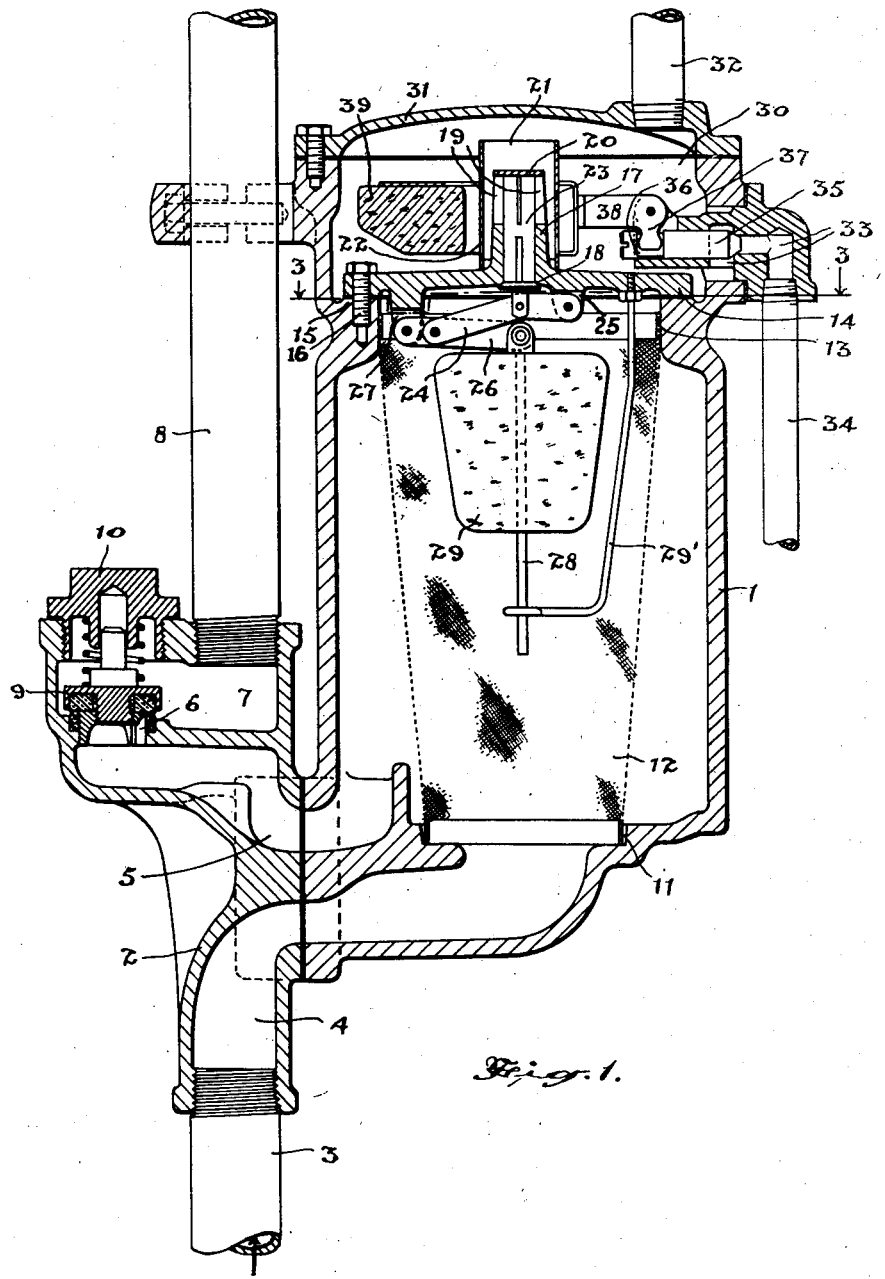
Figure 2:
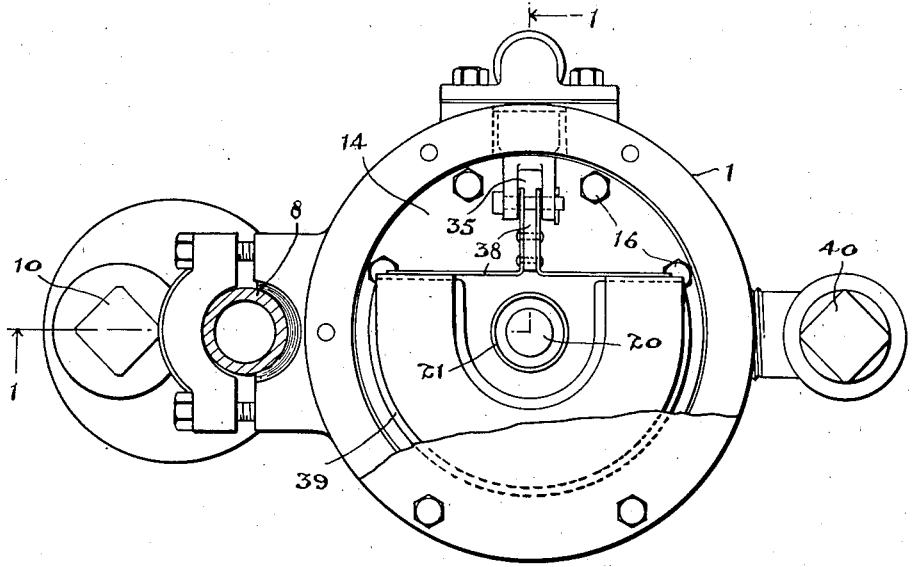
Figure 2 is a plan view of the device with the cover partly broken away.
Figure 3:
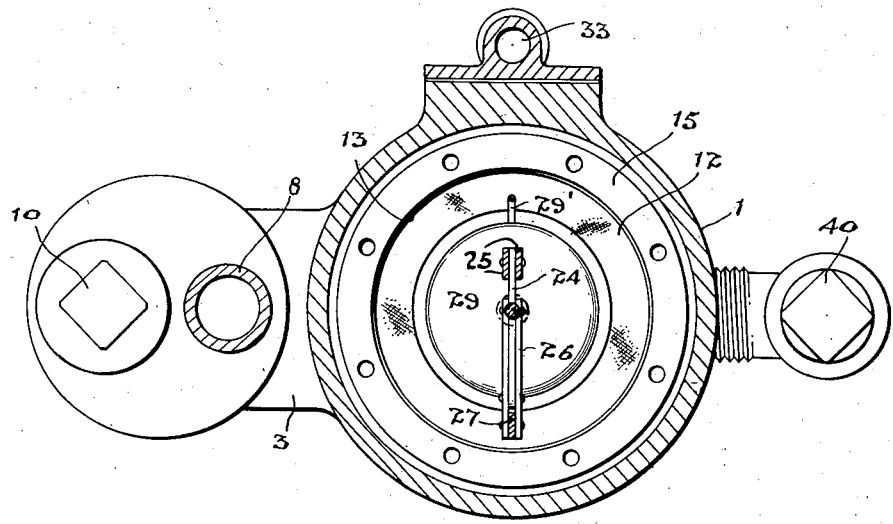
Figure 3 is a cross sectional view of the device taken on the line 3—3 of Figure 1.

In the operation of gasoline dispensing apparatus it is found that a considerable quantity of air becomes mixed with the liquid due to the agitating action of the pump and through other causes and in order that the purchasing public may be protected and that the metering device will measure accurately the quantity of liquid dispensed it is necessary that provision be made to eliminate the air thus associated with the liquid.

The present invention comprises a chamber introduced in the conduit between the feed pump (not shown) and the meter (not shown) and consists of a casing 1 of substantially cylindrical form having at its lower end an offset extension 2 which is shaped to receive the threaded end of the pipe 3 leading from the pump.

A passage 4 leads from the extension to the centre of the bottom of the casing.

Above the trap passage 4 is arranged a passage 5 which opens from one side of the casing above the inlet of the passage 4 and which leads to a valve controlled opening 6 communicating with a chamber 7 to which the pipe 8 leading to the meter is connected.

The valve 9 is of the spring loaded type and forms a foot valve to prevent the escape of liquid from the meter and the dispensing column. This valve is arranged at one side of the chamber 7 and is readily accessible by the removal of a plug 10.

Surrounding the end of the passage 4 at the entrance to the chamber enclosed by the casing 1 is an annular recess 11 and within this recess is supported a screen 12 which is in the shape of a frustum of a cone having its narrow end arranged in said recess and its upper end fitting closely to the slightly reduced cylindrical wall 13 of the casing 1.

A pressure cover 14 is seated upon a flange 15 and is rigidly secured in sealed contact therewith by the screws 16.

This cover is provided with a boss 17 rising centrally therefrom which has a central vertical orifice therethrough provided with a valve seat 18 at the bottom.

The upper external portion of the boss 17 is of a lesser diameter than the base thereof and the upper portion is perforated by the transverse slots 19.

A circular plate 20 is secured upon the upper end of the boss and forms a splash plate.

Surrounding the boss and spaced from the reduced and slotted portion is a tube 21 which is open at the top and forms an anti-splash, openings 22 being arranged in said tube close to the bottom and below the slots 19 in the boss.

Slidably arranged within the boss and having its head end engaging the valve seat 18 is a valve 23 which opens downwardly.

The valve 23 is supported by a lever 24 pivoted in a slotted lug 25 extending downwardly from the cover 14 and the free end of said lever is pivotally connected intermediate of the length of a lever 26 which is pivotally supported in a slotted lug 27 extending downwardly from the pressure cover 14.

The lever 26 extends inwardly to the axis of the casing 1 and has pivotally secured to its free end the jaw end of a rod 28 to which is secured a float 29 which may be of any suitable material and is adapted, on the rising of the float within the casing to a predetermined level, to swing the lever 26 upwardly to operate the lever 24 to close the valve 23 against the seat 18.

A guide 29' retains the lower end of the float rod 28 in its axial position.

When the liquid pump is not in operation any air or gas which has accumulated through the operation of the pump will find its way upward into the casing 1 and will rise to the top of said casing, thus lowering the level of the liquid within the casing. The lowering of the liquid in the casing causes the lowering of the float 29 and the air will continue to rise through the valve passage in the boss 17 and escape into the chamber 30 arranged above the pressure cover 14 and upon the starting of the pump the inward flow of liquid to the casing 1 forces a further quantity of air accumulated above the liquid through the valve opening in the pressure cover. The continued inward flow of liquid to the casing under the action of the pump causes the float to rise and close the valve 23 against its seat and seal the upper end of the casing.

The action of the liquid within the casing 1 may be turbulent and a certain amount of liquid may be expelled through the valve passage with the air. The splash plate 20 and tube 21 prevent undue turbulence in the upper chamber 30 which forms part of the casing 1 which chamber is enclosed by a cover 31 provided with a vent pipe 32.

Leading from the chamber 30 is a passage 33 which is connected by a pipe 34 back to the suction line of the pump to conduct any overflow liquid back to the supply.

Within the passage 33 is a valve 35 here shown of the sliding type provided with a slot 36 in which the short end 37 of the float lever 38 extends.

The weight of the float 39 carried on the lever 38 normally holds the valve 35 closed but when the level of liquid within the chamber 30 rises to a predetermined point the valve opens and allows the liquid to return to the supply.

In the operation of the device the liquid is forced by the pump through the pipe 3 into the casing 1 and air that is in the casing is forced upwardly and out through the passage in the pressure cover until the valve 23 is closed by the operation of the float 29. The liquid flows outwardly through the screen to the outer part of the casing and upon the opening of the discharge through the meter the liquid flows through the passages 5 and 7 to the pipe 8 which conducts it to the meter and discharge.

It will be readily appreciated that the suction of the pump will under certain conditions draw air from the supply tank and as the supply to the meter is taken from the bottom of the casing 1 and air in the fluid will be trapped within the casing and will rise to the top. Eventually the quantity of air in the top of the casing 1 will cause the operation of the float 29 through the change in level of the liquid in the casing and the air escapes freely through the open valve 23 into the upper chamber 30 from whence it is free to escape through the vent pipe 32 and any liquid reaching the chamber 30 is ultimately discharged by gravity through the vent 34 when the level of the liquid in chamber 30 attains a level sufficient to raise the valve float 39.

In putting a dispensing apparatus with this device into operation it is preferable to prime the casing 1 and for that purpose a priming fitting 40 is arranged at the bottom end of the casing.

What I claim as my invention is:—

1. An air eliminator for fluid pump equipment, comprising a casing having a passage leading centrally from the bottom and adapted to be connected with the pump discharge, a flange arranged adjacent to the top of said casing and extending inwardly, a pressure cover secured to said flange, a cover closing the outer end of said casing and forming therewith an upper chamber, a screen encircling the inlet passage at the bottom and extending upwardly to said flange, an air passage terminating at one end within the upper end of said encircling screen and terminating at the other end within said upper chamber, liquid operated means for controlling the opening and closing of said air passage, and a fluid return passage leading externally from the bottom of the upper chamber.

2. An air eliminator for liquid pump equipment, comprising in combination, a casing having an inlet and an outlet at the lower end, said casing being formed with an open top and having an annular inwardly extending flange spaced below the open top, a pressure plate removably secured to said flange and forming with said casing a lower chamber, a valve controlling a passage through said pressure plate, float mechanism suspended from the underside of said pressure plate within said lower chamber for controlling said valve, a valved passage leading externally of said casing from a point above said removable pressure plate, a float operatively housed in the casing above said pressure plate, said float controlling the valve of said latter passage and being insertable and removable through the open top of said casing, a cover plate removably secured to the upper end of said casing and closing the same, and a vent in said cover plate.

3. An air eliminator for liquid pump equipment, comprising in combination, a casing having an inlet and an outlet at the lower end, said casing being formed with an open top and having an annular inwardly extending flange spaced below the open top, a filter sleeve disposed between said inlet and outlet and extending from the bottom of said casing and having its upper end fitting within said annular flange, said filter sleeve being insertable and removable through the open top of said casing, a pressure closure plate removably secured to said annular inturned flange and closing the upper end of said filter sleeve, a closure cap removably secured to the open end of said casing and forming with said former plate and the side wall of the casing an upper float chamber, a float enclosed in said latter chamber and controlling the outlet of liquid therefrom, an air vent from the upper level of said float chamber, a float operating within the casing below said removable pressure closure plate, and a valve controlled by said latter float and controlling a passage through said removable pressure closure plate.

4. An air eliminator for liquid pump equipment, comprising in combination, a casing having an inlet and an outlet at the lower end, a partition intermediate of the height of said casing dividing same into upper and lower chambers, a filter sleeve in the lower chamber having one end fitting over the inlet of said casing and having its other end terminating at said partition and closed thereby, a valved passage in said partition connecting the interior of said filter sleeve with said upper chamber, a float enclosed within said filter sleeve in the lower chamber and controlling the valve of said passage, an air vent in the upper chamber, and means enclosed in said upper chamber for controlling the outlet of liquid therefrom.

5. In an air eliminator, the combination of a casing having an inlet passage and an outlet passage at the bottom opening outwardly at one side of the casing, a casting secured to the side of said casing and formed with inlet and outlet passages, the outer ends of which are axially aligned and the inner ends being spaced to register respectively with the inlet and discharge passages of said casing, and means controlled by the level of liquid in said casing for releasing trapped air from said casing.

WILLIAM H. D. BROUSE.